United States Patent [19]

Ivanova et al.

[11] Patent Number: 4,957,752
[45] Date of Patent: Sep. 18, 1990

[54] PROCESS FOR PRODUCING KEFIR

[75] Inventors: Lilia N. Ivanova; Irina V. Rozhkova; Vera F. Semenikhina; Tatyana N. Knyazeva, all of Moscow; Alexandr P. Chagarovsky, Odessa, all of U.S.S.R.

[73] Assignee: Vsesojuzny Nauchno-Issledovatelsky I Konstruktorsky Institut Molochnoi Promyshlennosti, Moscow, U.S.S.R.

[21] Appl. No.: 294,507

[22] PCT Filed: Apr. 20, 1988

[86] PCT No.: PCT/SU88/00088
§ 371 Date: Dec. 15, 1988
§ 102(e) Date: Dec. 15, 1988

[87] PCT Pub. No.: WO88/08252
PCT Pub. Date: Nov. 3, 1988

[30] Foreign Application Priority Data

Apr. 30, 1987 [SU] U.S.S.R. .................. 4230674

[51] Int. Cl.$^5$ .................. A23C 9/13; A23C 9/142
[52] U.S. Cl. .................. 426/43; 426/42; 426/62; 426/491; 426/495
[58] Field of Search .................. 426/42, 34, 43, 62, 426/580, 583, 491, 495

[56] References Cited

FOREIGN PATENT DOCUMENTS

| | | | |
|---|---|---|---|
| 61-135540 | 6/1986 | Japan | 426/43 |
| 0624592 | 9/1978 | U.S.S.R. | 426/42 |
| 1132888 | 1/1985 | U.S.S.R. | 426/42 |
| 1140738 | 2/1985 | U.S.S.R. | 426/43 |
| 1227146 | 4/1986 | U.S.S.R. | 426/43 |

OTHER PUBLICATIONS

"Ultrafiltration Processing of Milk Raw Materials and Tendencies in its Further Treatment", Review Information, Moscow, 1986, p. 23.
Zobkoua et al., "Production of Milk and Dairy Products with Fillers and Vitamins", 1985, Moscow, p. 80.

*Primary Examiner*—Marianne Cintins
*Attorney, Agent, or Firm*—Burgess, Ryan & Wayne

[57] ABSTRACT

A process for producing kefir is provided which involves normalization of purified cow milk with respect to the content of dry solids by ultrafiltration of the milk at a temperature of 50°–55° C. till the content of dry solids is increased in the normalized milk by 0.5–4.0% by mass, further heat treatment at the temperature of 140° C., introduction into the normalized milk of a leaven prepared using kefir fungi, leavening of the resulting mixture to a pH of 5.0–4.7, residence of the leavened mixture at a temperature of 18°–20° C. to a pH of 4.7–4.5, followed by packing.

4 Claims, No Drawings

PROCESS FOR PRODUCING KEFIR

BACKGROUND OF THE INVENTION

1. Field of the Invention

The present invention relates to the dairy industry and, more particularly, to a process for producing kefir.

Kefir is a traditional foodstuff in a nutrient diet of various groups of population, including children, ill and weakened people. In the diet of this category of patients kefir accounts for up to 60% of the daily ration. From the standpoint of the modern concept of the nutrition hygiene the formula of this every-day product (kefir) has to be different. This, for baby's nutrition (from 6 months) it is necessary to use kefir with an increased content of protein as the main growth factor and with a lesser content of mineral salts and ethanol; for weakened persons, especially during the post-operation periods, a product is required which has a lowered content of lactose and an increased content of protein; for patients with gastro-intestinal tract diseases it is preferable to use a low-energy product possessing high antibacterial properties. A product with an increased content of protein may be used for nutrition of people after irradiation, since proteins contribute to a rapid removal of radioactive nuclides from the organism.

The therapeutic properties of kefir are caused by accumulation of the products of metabolism of microflora of the fungal leaven therein. The antibiotic substances produced by the kefir leaven microflora ensure antibiotic properties of the product which are manifested in respect of bacteria of the colibacillus group in the cultural group dilutions of 1:16, 1:32, Zonne chinelles 1:32, 1:64. During the storage of kefir a further accumulation of antibiotic substances occurs which contributes to improvement of its stability in storage.

2. Description of the Invention

Known in the art is a process for producing kefir, which comprises pasteurization of milk, its homogenization, cooling, leavening with leaven prepared with the use of kefir fungi, maturation and cooling of the final product (GB, B, 1300355). However, this process comprising the use of natural cows milk as the starting raw material does not guarantee the final product possessing the required organoleptic and rheological characteristics since, depending on the season of the year and geographic zones, conditions of feeding and variety of cattle the content of protein in milk can vary considerably. If the dry solids content in milk is less than 8.5%, it is impossible to obtain kefir with good rheological properties.

Known in the art is a process for producing a fermented-milk product (yoghurt) developed by "Unilever", a British company, which comprises concentrating the protein in the starting material to a mass portion thereof equal to 7-15% by way of ultrafiltration, thermal treatment of the concentrate at a temperature of 55° to 65° C. for 30 minutes or at 70°-80° C. without residence, cooling to a temperature of 40°-50° C., leavening with lactic-acid bacteria (of the species *Lactobacillus bulgaricus, Streptococcus lactis, Streptococus thermophilis, Lactobacillus acidophilis*), fermentation, packing and storage (cf. "Ultrafiltration Processing of Milk Raw Materials and Tendencies in its Further Treatment", Review Information, 1986, CNIITEMyasomolprom, Moscow, p. 23). The process of fermentation of yoghurt is based on lactic-acid fermentation which proceeds rather actively even upon increasing the protein concentration in milk up to 7-15% by mass. This is facilitated by rather high temperature (40°-42° C.) conditions of culturing and biochemical activity of the microorganisms incorporated in the leaven. The resulting product—yoghurt has an increased viscosity and a longer (as compared to kefir) storage period.

The cultures of microorganisms incorporated into the leaven for yoghurt form lactic acid which consists, for 90%, from the D(—) form which is non-physiological for a baby's organism, thus limiting the use of yoghurt for nutrition of certain categories of people.

The production of kefir is based on two, not one, processes, namely: the process of lactic-acid fermentation and the process of ethanolic fermentation.

The microflora of the fungal leaven for kefir incorporates not only lactic-acid bacteria, but yeast as well; the optimum for the development of the microorganisms included in the composition of the fungal kefir leaven is within the range of from 18° to 26° C. which differs substantially from that for yoghurt leaven—40°-42° C., wherefore the character of the development of these cultures in protein-enriched milk after ultrafiltration also differs substantially. Furthermore, upon elevation of the protein content in milk to over 7-15% by mass an adequate growth of the cultures incorporated in the kefir leaven (yeast) is not ensured. The fermentation process becomes extended in time, the product acquires a non-pronounced "empty" taste. Moreover, due to the long duration of the fermentation process in the final product proteolytic flaws appear: bitterness, foreign after-tastes.

Known in the art is a process for producing kefir which comprises enrichment of the desired product with a protein component. The process also involves purification of the starting milk, its normalization relative to the fat content, normalization relative to the dry solids content, heat-treatment, homogenization, cooling to the leavening temperature introduction of the leaven (prepared using kefir fungi) in a amount of 1 to 5% by mass of the milk, fermentation of resulting mixture, cooling of the curd, followed by maturation and cooling of the desired product. The normalization of milk relative to the content of dry solids is conducted by adding sodium caseinate to the fat-normalized milk. Dry sodium caseinate is preliminarily dissolved in milk at a temperature of from 60° to 70° C. (cf. Z. S. Zobkova et al. "Production of Milk and Dairy Products with Fillers and Vitamins", 1985, Agropromizdat Publishers, Moscow, p. 80).

However, the enrichment of kefir with dry sodium caseinate does not ensure the control of the desired product composition as regards the content of carbohydrates and mineral substances; neither does it improves the nutritions and biological value of the product and in many cases even lowers its organoleptic characteristics. This is due to the fact that in the preparation of sodium caseinate use is made of electrolytes and coagulation agents ($CaCl_2$, HCl, polysaccharides) which cause phase and structure changes in the milk proteins that provides a detrimental effect on their biological and nutritious value. Furthermore, it becomes impossible to produce kefir possessing good organoleptic and rheological properties.

SUMMARY OF THE INVENTION

The present invention is directed to the provision, by changing the ratio protein-lactose, of a process for producing kefir possessing a higher nutritions value at improved qualities of the final product.

This problem is solved by providing a process for producing kefir comprising purification of the starting cow milk, normalization thereof with respect to the content of dry solids, heat-treatment, introduction of a leaven prepared from kefir fungi thereinto in an amount of from 1 to 5% by mass of the milk, fermentation of the resulting mixture at a temperature of 20° to 25° C., cooling of the fermented mixture to a temperature of 6°-8° C. and packing. The normalization of the starting milk with respect to the content of dry solids according to the present invention is effected by way of ultrafiltration of the starting milk at a temperature of 50° to 55° C. by increasing the content of dry solids in the normalized milk by 0.5–4.0% by mass with respect to the content of dry solids in the starting milk; the heat-treatment of the normalized milk is effected at a temperature as high as 140° C. and fermentation of the mixture is conducted till a pH is obtained equal to 5.0–4.7, the fermented mixture is subjected to residence at a temperature of 18°-20° C. to obtain a pH equal to 4.7–4.5.

The present invention makes it possible to obtain kefir with a higher biological nutritious value (the protein efficiency factor is 98.5%, antibiotic properties relative to the colibacillus group bacteria are revealed in dilutions of the cultural liquid of down to 1:32, 1:64) and an improved aminoacid composition.

To ensure a fine particle size of the protein curd, its better assimilation in a child's organism, it is advisable, according to the present invention, to introduce sodium and/or potassium citrates into the starting milk after its purification in an amount of 0.02–0.03% by mass.

In order to obtain the desired product (kefir) of a dense consistence with an unbroken curd, according to the present invention it is advisable to carry out packing immediately after introduction of the leaven into the normalized milk, whereafter the leavened mixture is to be matured at a temperature of 20° to 25° C. to obtain a pH of 5.0–4.7 and then at a temperature of 18°-20° C. till a pH of 4.7–4.5.

To obtain kefir with improved connoisseur organoleptic properties it is advisable, according to the present invention, to add fruit-and-berry syrups in an amount of from 8 to 10% by mass and food-grade aromatizing agents in an amount of 0.005 to 0.01% by mass to the leavened mixture or to the mixture of the normalized milk with the leaven prior to packing.

Further objects and advantages of the present invention will become more fully apparent from the following detailed description of the process for producing kefir with reference to examples illustrating its particular embodiments.

Best Way of Carrying the Invention into Effect

The process for producing kefir according to the present invention is effected in the following manner.

The starting cows milk (whole milk—with the content of dry solids of 11.0% by mass, or skim milk—with the content of dry solids of 8.0% by mass) is subjected to purification to increase its sanitary and hygienic reliability, to reduce the bacterial insemination of the milk, to remove mechanical impurities and contaminants using milk-purification separators of conventional designs.

The purified whole milk is then subjected to fat normalization using known devices—separators for this purpose. During such normalization the content of fat in the milk is set at the level of, for example, from 1.0 to 3.2% by mass.

The purified milk and, if necessary, the fat-normalized milk are subjected to normalization with regards to the content of dry solids which, according to the present invention, is effected by way of ultrafiltration at a temperature of from 50° to 55° C. The ultrafiltration can be effected using conventional ultrafiltration units equipped with polysulphonamide second-generation membranes with a pore size not more than 200 Å allowed by the healthcare authorities for application in the food industry. The ultrafiltration should be preferably carried out under a pressure of not more than 6 atm.

The thickening of milk by the method of ultrafiltration makes it possible to increase the mass portion of the native protein in the final product (including that of serum proteins), to reduce the content of mineral salts and lactose, thus resulting in an increased viscosity and physical stability of the final product.

The thickening of milk by ultrafiltration should be carried out by increasing the content of dry solids by 0.5–4.0% by mass vs. the content of dry solids in the starting milk. At a content of dry solids in milk of less than 8.5% by mass (the content of dry solids is increased by less than 0.5% by mass) the rheological characteristics and the viscosity of the product remain substantially unchanged as compared to those of common milk which is insufficient to obtain a product possessing good organoleptic characteristics. Increasing the concentration of dry solids by more than 4.0% by mass (the content of dry solids in the milk is 16.0% by mass) results in a considerable increase in viscosity, the curd density; the product also loses its organoleptic specificity.

Upon thickening of milk by the method of ultrafiltration to a mass portion of dry solids of 8.5–16% by mass, the processes of lactic-acid and ethanolic fermentation proceed rather actively. Accumulated in the final product are up to 1.5–2% by mass of lactic acid in the optically active L(+) form and the following groups of microorganisms, cells in 1 ml:

| | |
|---|---|
| mesophylic lactic-acid streptococci of the *Streptococus lactis, Streptococus cremoris* species | $10^9$ |
| aroma-forming | $10^7$ |
| yeast | $10^5$ |
| acetic-acid bacteria | $10^5$ |
| thermophylic lactic-acid bacilli | $10^5$ |

The product has a clearly pronounced specific taste and aroma, a sufficiently dense, non-stratifying homogeneous consistence. It is suitable for nutrition of children, ill and weakened people.

The use of ultrafiltration in the production of kefir makes it possible to increase the mass portion of protein in the final product without increasing the mass portion of lactose. This results in an increased viscosity and a physical stability of the product.

By means of ultrafiltration of the milk raw material employed for the production of kefir, it also becomes possible to eliminate such disadvantage of the process as a non-controllable fermentation of the product during its storage which is attained through increasing the content of protein in the product and a partial removal of lactose therefrom.

In common milk the ratio protein-to-lactose is 1:1.5.

In a milk subjected to ultrafiltration the ratio protein-lactose is 1:1.1 which, in addition to the aforesaid, provides a positive effect on the assimilability of the product.

The process of ultrafiltration of milk is conducted at a temperature of from 50° to 55° C., since this ensures the maximum productivity of the ultrafiltration unit, the highest speed and the best effect of the filtration (a high selectivity of membranes is ensured, including that in respect of lactose and mineral salts) which eventually provides a positive effect on the composition and quality of the final product.

In accordance with the present invention, subjected to normalization with regards to the content of dry solids by way of ultrafiltration is only a portion of the starting milk at a temperature of 50°-55° C. The thus-produced protein concentrate, wherein the content of dry solids is by 5–10% by mass higher than their content in the starting milk, is mixed with the portion of the starting milk non-subjected to ultrafiltration to yield a normalized milk with a content of dry solids by 0.5–4.0% by mass higher than their content in the starting milk.

The enrichment of the starting raw material with the protein concentrate containing serum proteins changes the aminoacid composition of the final product in the direction of increasing the total content of aminoacids including such indispensible ones as methionine, threonine, as well as cystine, serine, tyrosine which are vitally important for the human organism.

In the case where the content of dry solids in milk is increased by ultrafiltration by more than 2.0% by mass vs. the initial value, it is advisable, according to the present invention, to add potassium and/or sodium citrates in an amount of 0.02–0.03% by mass to the milk prior to the stage of ultrafiltration.

The introduction of the above-mentioned salts into the milk ensures later on a fine particle size of the protein fraction of the curd, a better assimilability of the desired product, its digestion (since in the presence of these salts the surface area of the protein particles onto which the gastric juice can act is increased).

Furthermore, during thickening of the milk by ultrafiltration to more than 2% by mass there occurs accumulation of insoluble calcium salts (calcium lactate) in the obtained product which impart foreign after-tastes to the milk. The introduction of potassium and sodium citrates results in the interaction of these compounds, followed by liberation of calcium salts in the form of a soluble salt-calcium citrate which finally improves the organoleptic characteristics of kefir.

Upon ultrafiltration of milk till a content of dry solids is increased less than by 2% by mass, the increase of calcium salts in the concentrate is insignificant and does not provide a detrimental effect on the organoleptic properties of the final product.

After introduction of citrates the milk is subjected as it has been already mentioned hereinbefore, to fat content normalization and dry solids normalization which are effected by way of ultrafiltration at 50°-55° C. to a concentration of 8.5-16.0% by mass (an increase by 0.5–4.0% by mass) or by way of addition of a protein concentrate obtained by ultrafiltration.

The milk subjected to the ultrafiltration is heat-treated at a temperature within the range of from 90° to 140° C. to ensure high sanitary-and-hygienic and rheological characteristics of the thus-obtained products. Then the milk is cooled to a temperature of 18°-25° C. and a leaven is introduced thereinto, which leaven has been prepared on the basis of kefir fungi, in an amount of from 1 to 5% by mass of the milk for leavening.

Kefir fungi comprise, as it is known, a natural symbiosis of the following microorganisms: lactic-acid streptococci, acetic-acid bacteria, lactic-acid bacilli and yeast both fermenting and non-fermenting lactose.

For the preparation of the leaven use is made of a conventional process comprising pasteurization of skim milk at a temperature of 80°-95° C., followed by cooling to 15°-25° C. Into the thus-prepared milk the above-mentioned kefir fungi are introduced at the rate of 1 part of the fungi per 30-50 parts of milk. In so doing, during the leavening the mixture of the fungi with the milk is intermittently stirred for 1–10 minutes preferably every 6 hours since the beginning of introduction of the fungi into the skim milk. Then the kefir fungi are separated from the resulting leaven.

Depending on the end use of kefir, the conditions for culturing of the leaven can be slightly varied. Thus, for a baby kefir the process for the preparation of leaven is substantially reduced in order to lower the content of yeast.

The character of development of the kefir microflora in the milk subjected to ultrafiltration does not substantially differ from that in a common milk in the production of kefir by a conventional process. However, in the presence of an increased amount of protein a higher biochemical activity of the microorganisms is noted. As a result, the microflora of the kefir leaven obtained from the milk subjected to ultrafiltration develops at a higher rate which makes it possible to reduce the duration of the process of the desired product preparation.

The intensification of the process of leavening of kefir prepared on the basis of the dairy raw material subjected to ultrafiltration is illustrated by the characteristics of acidity of the product shown in Table 1 hereinbelow.

TABLE 1

Varition of the product acidity (pH) vs. the content of dry solids and duration of the process

| Process duration, h | Control pH | Mass portion of dry solids | | |
|---|---|---|---|---|
| | | 8.5 pH | 9 pH | 10 pH |
| 1 | 2 | 3 | 4 | 5 |
| 0 | 6.6 | 6.65 | 6.65 | 6.63 |
| 6 | 5.85 | 5.82 | 5.8 | 5.78 |
| 10 | 5.09 | 5.1 | 5.12 | 5.1 |
| 12 | 4.78 | 4.8 | 4.8 | 4.75 |
| 16 | 4.62 | 4.62 | 4.5 | 4.51 |

| Process duration, h | Mass portion of dry solids | | | |
|---|---|---|---|---|
| | 11 pH | 12 pH | 15 pH | 17 pH |
| 1 | 6 | 7 | 8 | 9 |
| 0 | 6.6 | 6.58 | 6.55 | 6.52 |
| 6 | 5.75 | 5.72 | 5.7 | 5.7 |
| 10 | 5.02 | 5.0 | 4.98 | 4.9 |
| 12 | 4.72 | 4.7 | 4.7 | 4.65 |
| 16 | 4.48 | 4.45 | 4.45 | 4.43 |

The leavening of the product is conducted at a temperature within the range of from 18° to 25° C. till the formation of a curd (pH=5.0-4.7), whereafter the curd is cooled to a temperature of 18°-20° C. and maintained to a pH of 4.5-4.7.

After the formation of the curd and reaching the pH of 5.0-4.7 the process of the lactic-acid fermentation cannot be regarded as completed. In view of an increased content of the protein and dry solids the lactic-acid taste of the resulting product proves to be only slightly pronounced. For a further accumulation of the products of metabolism of lactic-acid microorganisms in the curd and a simultaneous activation of the process of ethanolic fermentation the leavened mixture is maintained at a temperature of 18°–20° C. at which the lactic-acid microorganisms still continue to develop and, at the same time, the development of the yeast microflora is intensified, because at temperatures above 20° C. the yeast microflora develops but very slowly—an optimal temperature for the growth of the yeast microflora is 14°–18° C.

The residence of the leavened mixture at a temperature of 18°–20° C. till a pH of 4.5–4.7 is reached results in an active accumulation of lactic-acid bacteria in the product.

During the residence at 18°–20° C. on expiration of the first hour the milk curd is stirred for 10–15 minutes.

The time for the subsequent agitations of the curd during the residence period is scheduled depending on/the required composition of the microflora and the end use of the product.

Depending on applications of the final product, by varying the process parameters within the above-specified ranges it is possible to control the content of microflora in the final product.

Kefir employed for baby's food should contain a smaller amount of yeast which, during their vital activity produce, in addition to vitamins of the group B and $CO_2$, an insignificant amount of ethanol which is undesirable in foodstuffs for children. In this case the product residence after the leavening is shortened to 3–4 hours which ensures a lesser content of yeast in the final product. This, however, does not impair taste qualities of the product, its nutritious and biological value. By varying the leavening conditions according to the present invention, cooling and subsequent residence of the milk curd, it is possible to ensure the required development of all groups of the leaven microflora in the milk with an increased content of dry solids. The application of the conditions for leavening, cooling and a subsequent residence of the curd according to the present invention in combination with an increased content of dry solids in the starting milk considerably changes the structural and mechanical properties of kefir. Kefir prepared by the process according to the present invention has a good dense structure which does not release whey.

The leavened mixture maintained at a temperature of 18°–20° C. to a pH of 4.5–4.7 is cooled to a temperature of 6°–8° C. and delivered to packing.

According to the present invention, it is advisable to incorporate fruit-berry syrups in an amount of 8–10% and food aromatizing agents in an amount of 0.005 to 0.01% by mass into the leavened mixture prior to packing thereof. It is possible to introduce the above-mentioned syrups and aromatizers into a mixture of an ultrafiltrated milk and a leaven.

According to the present invention the packing can be effected also right after the residence of the leavened mixture carried out, as it has been already mentioned herein-before, at a temperature of 18°–20° C. till a pH of 4.5–4.7 is reached.

Furthermore, it is possible to perform the packing immediately after introduction of the leaven into the milk normalized with respect to the content of dry solids.

The content of all groups of microorganisms in the final product obtained from a milk with an increased content of dry solids does not differ from the amount of these microorganisms in the final product prepared by a conventional process.

During the stages of leavening and cooling, followed by residence of the product, under the effect of biochemical and microbiological processes changes in organoleptic and physico-chemical characteristics of the employed thickened milk occur.

As a result of utilization of lactose by lacticacid bacteria and yeast, its content in the final product is reduced by 0.9–1.5%, lactic acid is accumulated, as well as aroma-forming substances (acetaldehyde, acetone, acetoin) and enzymes.

The proteolytic activity of lactic-acid bacteria causes variation of the protein composition; free aminoacids are accumulated along with live cells of microorganisms and products of their vital activity; the synthesis of B group vitamins (riboflavin, folic acid) also takes place.

The ultrafiltration according to the present invention does not bring about changes in the native properties of the starting milk raw materials which ensures a better assimilation of the product, its nutritious and biological value.

The protein efficiency factor for kefir with mass portion of dry solids of 8.5% by mass produced by a conventional process was 96.3%, whereas for kefir produced by the process according to the present invention was 98.5% at the same content of dry solids which points to an increased nutritious and biological value of the product.

The antibiotic properties of kefir produced by the process according to the present invention with respect to bacteria of the coli bacillus group are manifested in dilutions of the cultural liquid of 1:32, 1:64. The resulting kefir contains the following aminoacids: valine (185 parts by weight), isoleucine (196 parts by weight), leucine (340 parts by weight), lysine (280 parts by weight), methionine (95 parts by weight), threonine (163 parts by weight), phenylalanine (184 parts by weight), alanine (131 parts by weight), arginine (130 parts by weight), aspartic acid (264 parts by weight), histidine (101 parts by weight), glycine (63 parts by weight), glutamic acid (621 parts by weight), proline (341 parts by weight), serine (230 parts by weight), tyrosine (193 parts by weight), cystine (55 parts by weight).

For a better understanding of the present invention, the following specific examples illustrating its particular embodiments are given hereinbelow.

EXAMPLE 1

1,209 kg of skim milk with the content of dry solids of 8% by mass (2.9% by mass of protein) are maintained for 1 h, purified, preheated to the temperature of 50° C. and delivered to an ultrafiltration unit provided with polysulphonamide membranes with a pore size of not more than 200 Å; the ultrafiltration is carried out till the content of dry solids in the concentrate of 8.5% by mass (3.4% by mass of protein) to obtain 1,000 kg of a thickened skim milk with the mass portion of dry solids of 3.5%.

Then the concentrated milk is subjected to pasteurization at the temperature of 95° C. with the residence time of 2 minutes, cooled to 22° C., leavened with a kefir leaven in the amount of 2% by mass, subjected to leavening till the pH of 5.0 is reached, then cooled to 18° C. and at this temperature the kefir is maintained till the pH of 4.5 is reached. Then the resulting product is intermixed, dispensed and cooled to the temperature of 8° C. The thus-prepared product has a uniform cream-like consistence (viscosity of 28 seconds), enriched in whey proteins with a pure fermented-milk taste, refreshing, slightly piquant after-taste. Colour—milk-white with a creamy shade. The mass portion of dry solids is 8.5% by mass (3.4% by mass of protein). The acidity is 100° T., the calorific value of the final product is 35 kcal.

EXAMPLE 2

Into 1,000 kg of whole milk with the content of dry solids of 11% by mass (fat—3% by mass, protein—2.8% by mass) 300 g of potassium and sodium citrates are introduced in equal portions, 15 kg of a protein concentrate produced by ultrafiltration of a milk raw material till the content of dry solids is made equal to 12% by mass; the mixture is thoroughly intermixed, purified, preheated to the temperature of 55° C., homogenized under the pressure of 20 MPa, pasteurized at the temperature of 90° C. with residence of 3 minutes, cooled to 25° C., leavened with a fungal kefir leaven employed in the amount of 1% by volume of the leavened mixture, leavened to the pH of 4.7 and cooled to 20° C. At this temperature kefir is maintained till the pH of 4.7, then it is stirred, dispensed and cooled to 6° C. A fermented-milk product is thus obtained with the mass portion of dry solids of 12%, having a uniform cream-like consistence, pure fermented-milk refreshing slightly piquant taste, viscosity of 32 seconds, acidity of 110° T (against Turner's scale) and calorific value of 38 kcal.

EXAMPLE 3

Into 1,400 kg of whole milk with the content of dry solids of 11% by mass 230 g of potassium and sodium citrates are introduced, purified, preheated to 53° C., homogenized under the pressure of 20 MPa, and subjected to ultrafiltration till the content of dry solids in the concentrate is equal to 16% by mass. The concentrate is then heat-treated at 135° C. for seconds, cooled to 22° C., leavened with a fungal leaven (3% by mass), dispensed into small-volume containers, cooled to 20° C., leavened till a curd with the pH of 4,7 is formed and then cooled to the temperature of 8° C. The resulting product has a dense, uniform, cream-like consistence and the viscosity (determined as the time of flowing of a kefir curd from a funnel) of 40 seconds. The product has a pure fermented-milk specific taste and aroma and is of a milk-white colour.

The mass partion of dry solids in the products of 16% by mass (6.0% by mass of protein), acidity—95° T. The product in enriched in whey proteins, the ratio of protein-to-lactose is 1:1. This is more favourable for assimilation than in the case of common milk.

The product features an increased stability in storage, does not change its organoleptic characteristics when stored in a refrigerator at the temperature of 6° C. for 5 days.

EXAMPLE 4

Into 500 kg of whole milk with the content of dry solids of 11.4% by mass 300 g of potassium citrates are introduced, purified, preheated to 50° C., homogenized, ultrafiltrated till the content of dry solids of 15% by mass; the concentrate is subjected to a heat-treatment at the temperature of 92° C. with residence of 5 minutes, cooled to 25° C., added with 3% of kefir leaven, dispensed into small-volume containers, maintained at this temperature till the pH of 5.0, cooled to 18° C. kept at this temperature till the pH of 4.5, then rapidly cooled to 8° C. and stored in a cooling chamber.

The resulting fermented-milk product has a specific taste and aroma, a dense consistence, a milk-white colour, the acidity of 106° T and the content of dry solids of 15% by mass (5.0% by mass of protein).

The product has a high nutritious and biological value, a good assimilability, an increased viscosity of up to 40 seconds.

EXAMPLE 5

Kefir is produced under conditions similar to those described in Example 1 hereinbefore, except that prior to packing 90 kg of citrus syrup and 100 g of citrus ethereal oil are added thereto.

The resulting product has a uniform consistence, it is enriched in whey proteins and fruit additives; it has a refreshing slightly piquant taste and a pronounced aroma of the added filler.

EXAMPLE 6

Kefir is obtained under conditions similar to those described in Example 1, but prior to packing of the final product it is added with 80 kg of a strawberry syrup and 70 g of a natural aromatizer.

The resulting product has a uniform consistence, a refreshing slightly piquant taste and a pronounced aroma of the introduced filler.

EXAMPLE 7

Kefir is produced under conditions similar to those described in Example 2; prior to packing of the final product it is added with 85 kg of an apricot syrup and 60 g of a natural identic aromatizer.

The resulting product has a uniform consistence, a high content of whey proteins and fruit additives; it also has a refreshing slightly piquant taste and a pronounced aroma of the added filler.

INDUSTRIAL APPLICABILITY

The present invention wey find application in the production of kefir intended for dietetic nutrition and treatment-and-prophylactic nutrition of children.

We claim:

1. In a process for producing Kefir from cows milk, wherein the milk is purified, normalized with respect to the dry solids content, heat treated to sanitize the milk, kefir producing microorganisms are introduced into the milk to form a milk mixture, the milk mixture is fermented, the fermented milk mixture is cooled to a storage temperature and packed, the improvement which comprises:
   (a) normalizing the dry solids content of the milk by ultrafiltration of at least a portion of the milk, to increase the content of dry solids in the milk by from 0.5–4.0% by weight;
   (b) heat treating the normalized milk at a temperature of from 90° C. to 140° C.;
   (c) cooling the heat treated milk;
   (d) introducing a leaven comprising kefir producing microorganisms into the cooled milk;
   (e) fermenting the cooled milk mixture containing the kefir producing microorganisms at a temperature of from 18° C.–25° C. until a fermented milk mixture with a pH in the range of 4.7–5.0 is formed; and (f) further fermenting the fermented milk mixture with the pH in the range of 4.7–5, at a temperature of from 18°–20° C., to form a further fermented milk mixture with a pH in the range of 4.5–4.7.

2. The process of claim 1, wherein the ultrafiltration of the milk is conducted at a temperature between 50° and 55° C.

3. The process of claim 1 wherein at least one of sodium citrate or potassium citrate is introduced into the milk after purification thereof in an amount of from 0.02 to 0.03 percent by weight.

4. The process of claim 1 wherein before packing, fruitberry syrups are introduced into the leavened mixture or into a mixture of the normalized milk with the leaven in an amount of 8 to 10 per cent by weight and food aromatizers in an amount of 0.005 to 0.01 percent by weight.

* * * * *